United States Patent
Collins

(10) Patent No.: US 7,184,563 B2
(45) Date of Patent: Feb. 27, 2007

(54) ELECTRET CONDENSER MICROPHONE

(75) Inventor: James Steven Collins, Elk Grove Village, IL (US)

(73) Assignee: Knowles Electronics LLC., Itasca, IL (US)

( * ) Notice: Subject to any disclaimer, the term of this patent is extended or adjusted under 35 U.S.C. 154(b) by 491 days.

(21) Appl. No.: 10/379,007

(22) Filed: Mar. 4, 2003

(65) Prior Publication Data

US 2005/0276429 A1   Dec. 15, 2005

(51) Int. Cl.
*H04R 25/00* (2006.01)

(52) U.S. Cl. ........................ 381/191; 381/174

(58) Field of Classification Search ............... 381/170, 381/174, 175, 176, 178, 190, 191, 355, 369; 29/594

See application file for complete search history.

(56) References Cited

U.S. PATENT DOCUMENTS

| | | | |
|---|---|---|---|
| 2,425,481 A | | 8/1947 | Morse |
| 3,588,382 A | | 6/1971 | Reedyk |
| 4,063,050 A | | 12/1977 | Carlson et al. |
| 4,234,811 A | | 11/1980 | Hishida et al. |
| 4,310,906 A | | 1/1982 | Cantrell, Jr. et al. |
| 4,321,432 A | | 3/1982 | Matsutani et al. |
| 4,582,961 A | * | 4/1986 | Frederiksen ............. 381/174 |
| 4,701,640 A | | 10/1987 | Flygstad et al. |
| 4,730,283 A | | 3/1988 | Carlson et al. |
| 5,097,515 A | | 3/1992 | Baba |
| 5,255,246 A | | 10/1993 | Van Halteren |
| 5,272,758 A | | 12/1993 | Isogami et al. |
| 5,335,286 A | * | 8/1994 | Carlson et al. ............. 381/174 |
| 5,490,220 A | | 2/1996 | Loeppert |
| 5,548,658 A | | 8/1996 | Ring et al. |
| 6,169,810 B1 | | 1/2001 | Van Halteren et al. |
| 6,178,249 B1 | | 1/2001 | Hietanen et al. |
| 6,532,293 B1 | | 3/2003 | Collins |
| 2002/0168076 A1 | | 11/2002 | Collins |
| 2003/0068055 A1 | * | 4/2003 | Tanabe et al. ............. 381/191 |
| 2005/0094831 A1 | * | 5/2005 | Okita ........................ 381/174 |

FOREIGN PATENT DOCUMENTS

| | | |
|---|---|---|
| DE | 43 29 993 A1 | 3/1995 |
| EP | 0 371 620 A2 | 6/1990 |
| EP | 0 371 620 A3 | 6/1990 |
| EP | 0 371 620 B1 | 6/1990 |
| EP | 0 531 613 A2 | 3/1993 |

(Continued)

OTHER PUBLICATIONS

International Search Report for Application No. PCT/US03/33894 dated Mar. 3, 2004.

*Primary Examiner*—Sinh Tran
*Assistant Examiner*—Brian Ensey
(74) *Attorney, Agent, or Firm*—Marshall, Gerstein & Borun LLP

(57) ABSTRACT

A condenser microphone having a housing, a diaphragm assembly and backplate located within the housing. A spacer isolates the diaphragm assembly from the housing and spaces the diaphragm assembly from the backplate. The spacer has a first portion disposed between the backplate and the diaphragm assembly, and a second portion disposed between the diaphragm assembly and the wall of the housing. A conductive member electrically connects the backplate to a ground.

23 Claims, 2 Drawing Sheets

FOREIGN PATENT DOCUMENTS

| | | |
|---|---|---|
| EP | 0 531 613 A3 | 3/1993 |
| EP | 0 531 613 B1 | 3/1993 |
| EP | 0533284 | 3/1993 |
| JP | 10136492 | 5/1998 |
| JP | 2000050394 | 2/2000 |
| JP | 20000115895 | 4/2000 |
| JP | 2002262395 | 9/2002 |
| JP | 2002374598 | 12/2002 |
| WO | WO 84/01683 | 4/1984 |

* cited by examiner

ELECTRET CONDENSER MICROPHONE

TECHNICAL FIELD

The present invention relates generally to microphones, and, more particularly, to electret condenser microphones.

BACKGROUND OF THE INVENTION

Transducers, including microphones and condenser-type microphones, are typically utilized in hearing-aids. Generally, condenser microphones comprise a housing having an aperture which allows acoustic vibrations to communicate with the interior of the case, a diaphragm assembly comprising a diaphragm and support ring, and a charged plate. The diaphragm is typically spaced a set distance from the charged plate. The condenser microphones also comprise a printed circuit board (PCB) having a field-effect transistor (FET) connected to the PCB. These components are mounted within the housing. Quite often the housing comprises a cup-shaped housing having a base surface and an upstanding peripheral wall. The wall terminates at a distal edge defining an opening. In assembly of the microphone, the distal edge of the housing wall is rolled closed at the upper edge against the PCB.

One way in which condenser microphones operate is by allowing acoustic vibrations to enter the housing and allowing the diaphragm to respond thereto. The vibrating diaphragm causes a capacitance change between the diaphragm and the backplate.

It is understood that electret condenser microphones require the diaphragm assembly to be spaced from the backplate an exact predetermined distance, and, in one configuration, the diaphragm assembly must be electrically isolated from the housing. Additionally, it is understood that one of the backplate or the diaphragm is connected to suitable electronic circuitry to permit the electroacoustical interaction of the diaphragm and electret material on the backplate to provide an electrical signal representative of the acoustic vibration that entered the microphone housing. This signal is developed by the capacitance change between the diaphragm and the backplate, and is transferred to the PCB and ultimately converted to sound to be heard by a listener. As is known, the converse operation may be provided in that an electrical signal may be applied to the electret on the backplate to cause the diaphragm to vibrate and thereby to develop an acoustic signal which can be coupled out of the acoustic chamber.

One type of electret condenser microphone is disclosed in U.S. Pat. No. 5,097,515 (the '515 patent). The '515 patent discloses a condenser microphone composed of a fixed electrode and a movable electrode. The movable electrode is formed by a vibratory diaphragm secured to an end face of a tubular metal ring. The diaphragm has a metal film deposited on one of its surfaces. The fixed electrode in the '515 patent, however, is formed by at least a portion of an end wall of the cup-shaped housing of the microphone assembly. Accordingly, since the fixed electrode of the '515 patent is formed by the microphone housing, the microphone is extremely sensitive to any pressure or deformation of the microphone housing. Specifically, any pressure or deformation of the microphone housing changes the spacing between the cup (i.e., fixed electrode) and the diaphragm, thereby detrimentally effecting the performance of the microphone. Additionally, in order to isolate the diaphragm ring from the microphone housing, the '515 patent discloses coating interior of the microphone housing with a Teflon® coating. Unfortunately, coating the interior of the microphone housing with a Teflon® coating is a relatively difficult and expensive process.

Accordingly, a condenser microphone in accordance with the present invention provides an inexpensive and simple solution to eliminate the drawbacks of the prior condenser microphones.

SUMMARY OF THE INVENTION

The present invention is adapted to provide an electret condenser microphone having a housing, a diaphragm, a diaphragm support, and a backplate which is simple and inexpensive to manufacture, and which provides improved acoustical properties and increased resistance to physical abuse. Generally, this type of microphone is suitable for hearing-aids, as well as for other uses.

According to one aspect of the present invention, the condenser microphone comprises a housing having a cavity defined by a base surface and a wall, a diaphragm assembly disposed within the cavity, a backplate adjacent the diaphragm assembly, and a spacer having a first portion disposed between the backplate and the diaphragm assembly and an integral second portion disposed between the diaphragm assembly and the wall of the housing. The spacer electrically isolates the diaphragm assembly from the housing.

According to another aspect of the present invention, the first portion of the spacer has a first perimeter, and the second portion of the spacer has a second perimeter. With this spacer, the second perimeter extends beyond the first perimeter.

According to another aspect of the present invention, the condenser microphone has a second spacer disposed between the backplate and the base surface of the housing. The second spacer has a conductive portion providing an electrical connection to a ground for the backplate.

According to another aspect of the present invention, the condenser microphone comprises a housing having an opening, a motor assembly, and a spacer. The motor assembly is located in the housing and comprises a diaphragm, a diaphragm support, and a backplate. The diaphragm is connected to the diaphragm support and is capable of vibrating. The spacer has a first portion and a second portion depending from the first portion. The first portion of the spacer is disposed between the diaphragm support and the backplate, and the second portion of the spacer is disposed between the diaphragm support and an internal wall of the housing to electrically isolate the diaphragm and the diaphragm support.

According to another aspect of the present invention, the second portion of the spacer comprises a plurality of tabs extending from the first portion of the spacer. The tabs may extend radially outward from the first portion of the spacer. Further, the spacer may have a notch adjacent the tabs to provide for transverse bending of the tabs about the internal wall of the housing.

According to another aspect of the present invention, the spacer has a body portion and a plurality of tabs depending from the body. The tabs extend in a direction transverse to the body portion upon insertion of the spacer in the housing cavity, and as such the tabs are positioned between the diaphragm and ring assembly and a wall of the housing.

According to another aspect of the present invention, a portion of a perimeter of the body portion of the spacer does not have a tab depending therefrom.

According to another aspect of the present invention, the spacer is made of a non-conductive material. In one embodiment, the spacer is plastic.

According to another aspect of the present invention, the condenser microphone comprises a housing having a cavity defined by a base surface and an upstanding peripheral wall, a motor assembly in the housing, and a support member disposed within the cavity of the housing and adjacent the base surface.

According to another aspect of the present invention, the support member is rigid and provides mechanical isolation for the backplate from the base surface of the housing. The support member has a first surface and a second surface, the first surface of the support member being adjacent the base surface of the housing, and the second surface of the support member being adjacent the second surface of the backplate.

According to another aspect of the present invention, the support member is electrically connected to the housing and to the backplate.

According to another aspect of the present invention, the condenser microphone comprises a housing, a motor assembly having a diaphragm assembly and a backplate, and a conductive member disposed adjacent the backplate. The conductive member provides electrical connection between the housing and the backplate to ground the backplate.

According to another aspect of the present invention, a method of constructing a condenser microphone is provided. Various steps of the method comprise: providing a cup-shaped housing having a base surface and an upstanding peripheral wall defining a cavity, the wall terminating at a distal edge defining an opening; placing a backplate in the cavity; placing a spacer in the cavity, the spacer having a first portion and an integral second portion, the first portion having a first perimeter and the second portion having a second perimeter that extends beyond the first perimeter, wherein the second portion of the spacer contacts the upstanding peripheral wall of the housing thereby bending the second portion of the spacer transverse to the first portion; and, placing a diaphragm assembly in the cavity.

According to another aspect of the present invention, the method of constructing the condenser microphone of the present invention comprises the step of placing a conductive spacer adjacent the cavity of the housing and the backplate to provide an electrical connection between the housing and the backplate.

According to yet another aspect of the present invention, the method of constructing the condenser microphone of the present invention comprises placing a printed circuit board across the housing opening adjacent the diaphragm assembly, and rolling the distal edge of the housing into engagement with the printed circuit board to seal the microphone.

Other features and advantages of the invention will be apparent from the following specification taken in conjunction with the following drawings.

DETAILED DESCRIPTION OF THE PREFERRED EMBODIMENT

Figure 1:
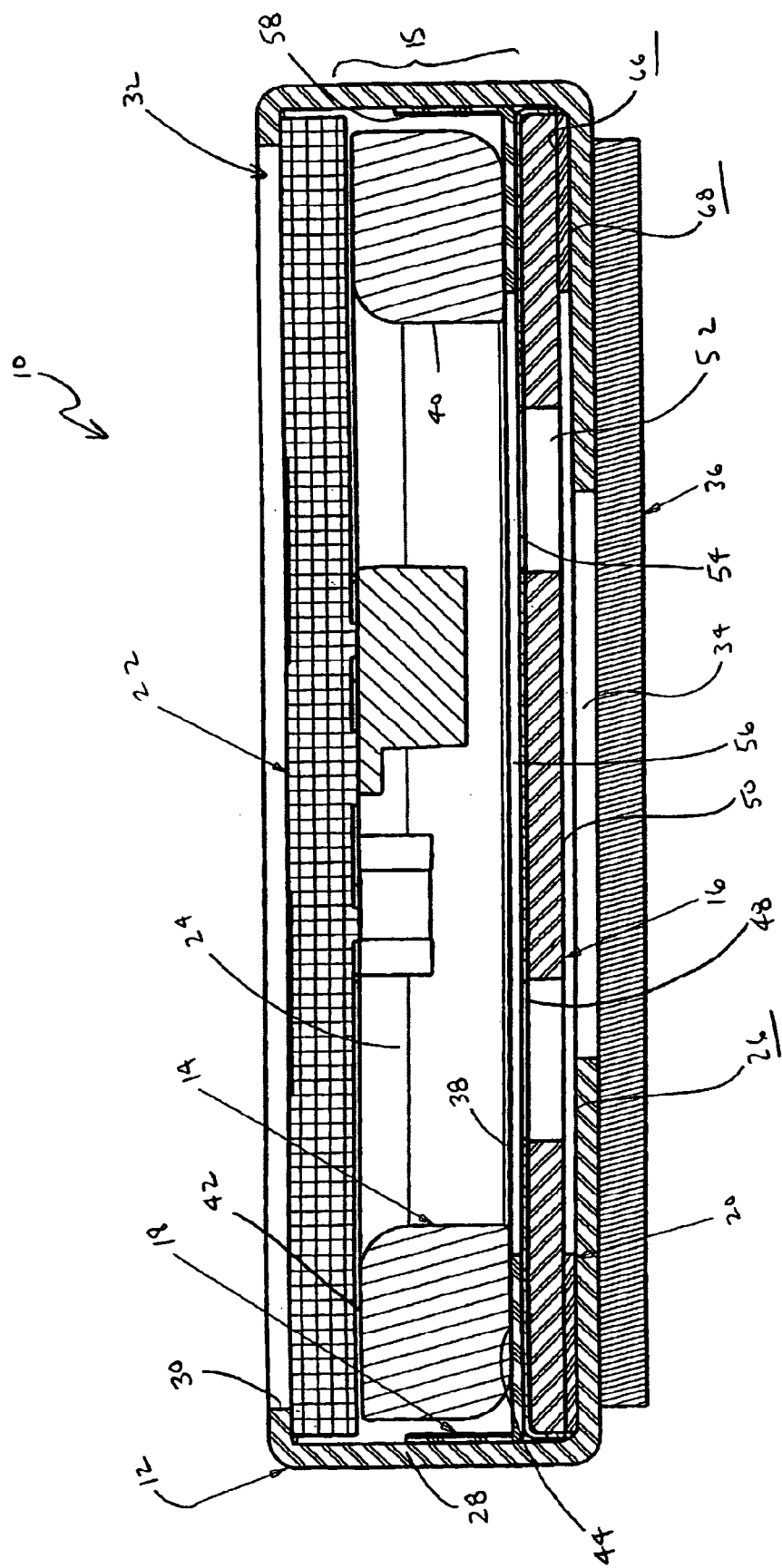
FIG. 1 is a cross-sectional elevation view of the condenser microphone of the present invention; and, FIG. 2 is an exploded perspective view of the condenser microphone of FIG. 1.

While this invention is susceptible of embodiments in many different forms, there is shown in the drawings and will herein be described in detail a preferred embodiment of the invention with the understanding that the present disclosure is to be considered as an exemplification of the principles of the invention and is not intended to limit the broad aspect of the invention to the embodiment illustrated.

Referring now in detail to the Figures, and initially to FIG. 1, there is shown a condenser microphone 10 of the present invention. In general, the condenser microphone 10 comprises a cup-shaped housing 12, a motor assembly 15, a spacer 18, a support member 20 and an amplifier circuit board 22. Generally, the motor assembly 15 comprises a diaphragm assembly 14 and a backplate 16 adjacent the diaphragm assembly.

The cup-shaped housing 12 of the condenser microphone 10 has a cavity 24 defined by a base surface 26 and an upstanding peripheral wall 28. The upstanding wall 28 of the housing 12 terminates at a distal edge 30, defining an opening 32. The housing 12 is made of a conductive material, or has a conductive material coating thereon. In the embodiment shown, the housing 12 is made of aluminum. Additionally, the housing typically has a thin wall thickness of approximately 0.1 mm. Because of the thin wall thickness, care must be taken not to deform the housing. A sound receiving aperture 34 is provided through the base surface 26 of the housing 12 to allow acoustical vibrations to enter the microphone housing 12. The sound receiving aperture 34 is covered with a dust guard 36 which is typically made of cloth or felt. The dust guard 36 is adhered to the housing 12 with an adhesive.

Figure 2:
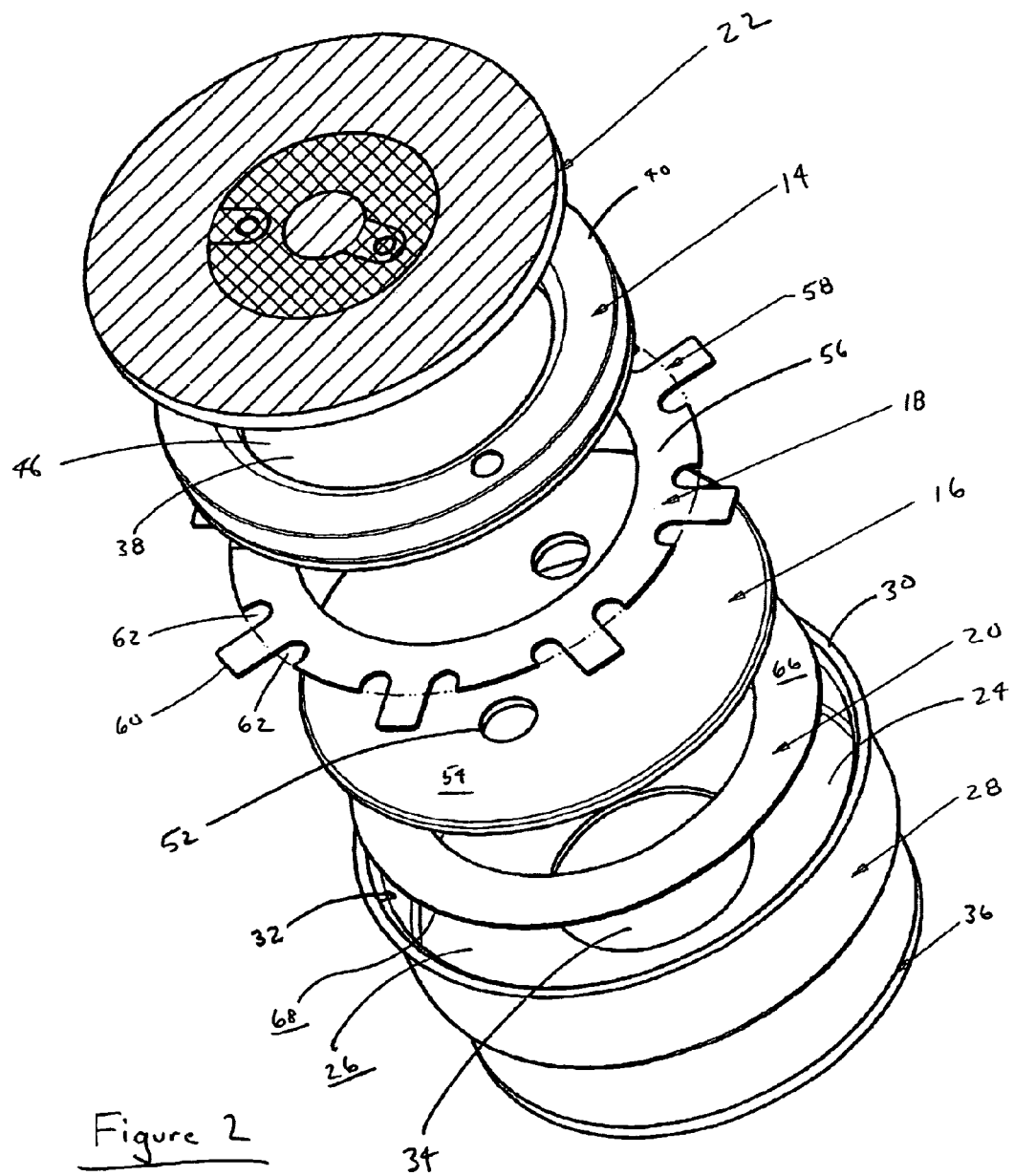

The diaphragm assembly 14 is disposed within the cavity 24 of the housing 12. The diaphragm assembly 14 comprises a vibratory diaphragm 38 connected to a ring member 40 or diaphragm support. As shown in FIGS. 1 and 2, the diaphragm support 40 has a first side 42, a second side 44, and an aperture 46 extending from the first side 42 through to the second side 44. In a preferred embodiment, the diaphragm support 40 is made of a 0.64 mm. thick stainless steel, however, any conductive material or coating, including brass or tin may be utilized.

The vibratory diaphragm 38 of the diaphragm assembly 14 comprises a film that is connected to a portion of the diaphragm support 40. The film of the diaphragm 38 must be capable of vibrating in response to sound waves. As such, the diaphragm 38 may be made of a 0.00006" (6 gauge) thick polyethylene terephthalate film, commonly available under the trademark MYLAR, or of any similar material. The diaphragm 38 is adhered to the second side 44 of the diaphragm support 40 adjacent the aperture 46 in the diaphragm support 40. A cement is utilized to adhere the diaphragm 38 to the diaphragm support 40. In its connected position, a central portion of the diaphragm 38 covers the aperture 46 in the diaphragm support 40 and is capable of vibrating thereabout. Typically nothing contacts the central portion 48 of the diaphragm 38 adjacent the aperture 46 in the diaphragm support 40.

The side of the diaphragm 38 adjacent the second side 44 of the diaphragm support 40 is coated with a metallizing layer of conductive material. One such conductive material is chromium. The metallized layer of the diaphragm 38 forms an electrically active portion of the diaphragm 38, commonly referred to as the movable electrode. The electrically active portion of the diaphragm 38 together with the backplate 16, or fixed electrode, provides the condenser which determines the capacitance varying under the influence of sound vibrations.

As explained above, the backplate 16 forms the fixed electrode of the condenser for the condenser microphone 10 of the present invention. The backplate 16 has a first side 48, a second side 50, and at least one aperture 52 extending from the first side 48 to the second side 50 to relieve pressure between the backplate 16 and the diaphragm 38, and also to allow the sound vibrations that enter the housing to vibrate the diaphragm 38. In the preferred embodiment, the backplate 16 is made of stainless steel. The backplate 16 has a first surface 54 that is plated with a polarized dielectric film or electret material. In the preferred embodiment, a Teflon® material is coated or plated on the first surface 54 of the backplate 16. The coated backplate 16 is referred to as the fixed electrode of the electret assembly. Additionally, the coated backplate 16 is electrostatically charged as well with approximately 360 V.

As best shown in FIG. 1, a spacer 18 is disposed between the diaphragm assembly 14 and the backplate 16. The spacer 18 has a first portion 56, or body portion, and an integral second portion 58 extending from the first portion. The first portion 56 of the spacer 18 is disposed between the diaphragm assembly 14 and the backplate 16, and the thickness of the first portion 56 of the spacer 16 sets the spacing between the diaphragm 38 and the backplate 16. The integral second portion 58 of the spacer 18 is disposed between the diaphragm assembly 14 and the wall 28 of the housing to electrically isolate the diaphragm assembly 14 from the housing 12.

The spacer 18 is generally made of a non-conductive material, and in the preferred embodiment the spacer 18 is made of a 200 gauge Mylar plastic made by Dupont. As shown in FIG. 1, the first portion 56 of the spacer 18 has a first perimeter, and the second portion 58 of the spacer 18 has a second perimeter. The second perimeter extends beyond the first perimeter. As shown, the second portion 58 of the spacer comprises a plurality of tabs 60 that extend radially from the first portion or body portion 56 of the spacer 18. A portion of the perimeter of the body portion 56 of the spacer 18, however, may not have a tab 60 depending therefrom.

Additionally, the spacer 18 may have at least one relief 62 adjacent the tabs 60 to allow the tabs 60 to be bent more easily. As shown in FIG. 1, the reliefs 62 comprise a notch adjacent the tabs 60 to provide for ease of transverse bending of the tabs 60 about the internal wall 28 of the housing 12.

As shown in FIG. 1, the spacer 18 provides for spacing the backplate 16 a set distance from the diaphragm assembly 14. This distance provides a defined gap between the backplate 16 and the vibratory diaphragm 38, enabling air movement between the diaphragm and the backplate. In a preferred embodiment, the spacing between the backplate 16 and the diaphragm 38 is 0.0020", the thickness of the spacer 18.

The dielectric film or electret material on the backplate 16 cooperates with the vibrating diaphragm 28 to develop an acoustic signal. As is understood by one of ordinary skill in the art, the operation of the microphone 10 is based on the change in capacitance between a fixed electrode, the backplate 16, and a movable electrode, the vibratory diaphragm 38, under the influence of external air (sound) vibrations. The change in this capacitance is proportional to the changes in air pressure and can be converted into amplified sound vibrations via the electronic amplifier. The amplifier then converts and amplifies the changes in capacitance into an electrical signal representative of those changes.

As shown in FIGS. 1 and 2, the support member 20, or second spacer, is disposed in the cavity 24 of the housing 12 between the backplate 16 and the base surface 26 of the housing 12. The support member 20 has a first surface 66 and a second surface 68. The first surface 66 of the support member 20 is located adjacent the base surface 26 of the housing 12, and the second surface 68 of the support member 20 is located adjacent the second side 50 of the backplate 16. The support member 20 is a rigid component that provides mechanical isolation for the backplate 16 from the base surface 26 of the housing 12. As such, the spacing between the backplate 16 and the diaphragm 38 are not affected by deformations in the microphone housing 12. The support member 20 may also have a conductive portion or coating which provides an electrical connection for the backplate to a ground through the housing. This support member 20 may be made of a 0.0020" thick stainless steel ring to mechanically isolate, but electrically connect, the backplate 16 to the housing 12.

The circuit board 22 for the microphone 10 is situated adjacent the first side 42 of the diaphragm support 40. The circuit board 22 carries electronic components, such as an FET, and closes the housing opening 32 when the distal edge 30 of the housing wall 28 is rolled down on the circuit board 22 as shown in FIG. 1.

The method of construction the condenser microphone 10 of the present invention is as follows. First, first surface 66 of the support member 20 is placed on the base surface 26 in the cavity 24 of the microphone housing 12. The backplate 16 is then located on the second surface 68 of the support member 20, with the plated first surface 54 facing away from the support member 20. Next, the spacer 18 is placed in the housing 12. As the spacer 18 is inserted into the housing 12, the tabs 60 of the spacer 18 deform at the notches 62, thereby allowing the second portion 58 of the spacer 18 which contacts the upstanding peripheral wall 28 of the cavity 24 to deform transversely to the first portion 56 of the spacer 18 at approximately the first periphery of the spacer 18. Next, the diaphragm assembly 14 is inserted into the housing. The diaphragm assembly 14 is inserted into the cavity 24 of the housing with the second side 44 having the vibratory diaphragm 38 facing the spacer 18. When the diaphragm assembly 14 is in position, the first portion 56 of the spacer 18 is positioned between the backplate 16 and the diaphragm assembly 14, and the second portion 58 of the spacer 18 is positioned between the diaphragm assembly 14 and the wall 28 of the housing 12. The amplifier circuit board 22 is placed across the housing opening 32 and on the first side 42 of the diaphragm support. Finally, the housing distal edge 30 is rolled into engagement with the amplifier circuit board 22 to seal the microphone 10. In this position, the diaphragm assembly 14 is in electrical connection with the components on amplifier circuit board 22, and the backplate 16 is in electrical connection with the ground through the conductive portions of the support member 20 and housing 12.

While the specific embodiment has been illustrated and described, numerous modifications come to mind without significantly departing from the spirit of the invention, and the scope of protection is only limited by the scope of the accompanying claims.

What is claimed is:

1. A condenser microphone comprising:
   a housing having an opening;
   a motor assembly in the housing, the motor assembly comprising a diaphragm, a diaphragm support, and a backplate, wherein the diaphragm is connected to the diaphragm support and is capable of vibrating; and,
   a spacer having a first portion and a second portion depending from the first portion, the first portion of the spacer being disposed between the diaphragm support and the backplate, and the second portion of the spacer being disposed between the diaphragm support and an internal wall of the housing to electrically isolate the diaphragm and the diaphragm support, wherein the second portion of the spacer comprises a plurality of tabs extending from the first portion of the spacer.

2. The condenser microphone of claim 1, wherein the spacer has a notch adjacent the tabs to provide for transverse bending of the tabs about the internal wall of the housing.

3. The condenser microphone of claim 1, wherein the tabs extend radially from the first portion of the spacer.

4. The condenser microphone of claim 1, wherein the second portion of the spacer is transverse to the first portion of the spacer when the spacer is fitted in the housing.

5. The condenser microphone of claim 1, wherein the spacer is plastic.

6. The condenser microphone of claim 1, wherein the spacer is made of a nonconductive material.

7. The condenser microphone of claim 3, wherein the spacer has a relief adjacent the tabs to assist in the assembly process of the condenser microphone.

8. The condenser microphone of claim 1, further comprising a conductive member electrically connecting the backplate to a ground.

9. A condenser microphone comprising:
a housing having a cavity defined by a base surface and an upstanding peripheral wall;
a motor assembly in the housing the motor assembly comprising a diaphragm, a diaphragm support, and a backplate having a first surface with an electret material thereon and a second surface, wherein the diaphragm is connected to the diaphragm support and is capable of vibrating; and,
a support member disposed within the cavity of the housing and adjacent the base surface, the support member being rigid and providing mechanical isolation for the backplate from the base surface of the housing, wherein
the support member is electrically connected to the housing and to the backplate.

10. The condenser microphone of claim 9, wherein the support member has a first surface and a second surface, the first surface of the support member being adjacent the base surface of the housing, and the second surface of the support member being adjacent the second surface of the backplate.

11. A condenser microphone comprising:
a housing having a cavity defined by a base surface and an upstanding peripheral wall;
a motor assembly in the housing the motor assembly comprising a diaphragm, a diaphragm support, and a backplate having a first surface with an electret material thereon and a second surface, wherein the diaphragm is connected to the diaphragm support and is capable of vibrating;
a support member disposed within the cavity of the housing and adjacent the base surface, the support member being rigid and providing mechanical isolation for the backplate from the base surface of the housing; and
a spacer having a first portion and a second portion depending from the first portion, the first portion of the spacer being disposed between the diaphragm and the backplate, and the second portion of the spacer being disposed between the diaphragm support and the wall of the housing to electrically isolate the diaphragm and the diaphragm support.

12. The condenser microphone of claim 11, wherein the first portion of the spacer has a first perimeter, wherein the second portion of the spacer has a second perimeter, and wherein the second perimeter extends beyond the first perimeter.

13. The condenser microphone of claim 11, wherein the spacer is plastic.

14. The condenser microphone of claim 11, further comprising a substrate closing one end of the cavity.

15. The condenser microphone of claim 14, wherein the substrate is a printed circuit board electrically connected to a transistor.

16. The condenser microphone of claim 11, further comprising a second spacer disposed between the backplate and the base surface of the housing.

17. The condenser microphone of claim 16, wherein the second spacer has a conductive portion providing an electrical connection for the backplate to a ground.

18. The condenser microphone of claim 11, wherein the second portion of the spacer is integral with the first portion of the spacer.

19. A condenser microphone comprising:
a housing having a cavity defined by a base surface and an upstanding peripheral wall;
a motor assembly in the housing the motor assembly comprising a diaphragm, a diaphragm support, and a backplate having a first surface with an electret material thereon and a second surface, wherein the diaphragm is connected to the diaphragm support and is capable of vibrating; and,
a support member disposed within the cavity of the housing and adjacent the base surface, the support member being rigid and providing mechanical isolation for the backplate from the base surface of the housing, wherein
the support member is made of a conductive material.

20. A condenser microphone comprising:
a housing having cavity;
a diaphragm and ring assembly disposed within the cavity;
a backplate adjacent the diaphragm and ring assembly; and,
a spacer between the diaphragm and ring assembly and the backplate, wherein the spacer has a body portion and a plurality of tabs depending therefrom, wherein the tabs extend in a direction transverse to the body portion upon insertion of the spacer in the housing cavity, the tabs positioned between the diaphragm and ring assembly and a wall of the housing.

21. The condenser microphone of claim 20, wherein the spacer has a notch adjacent the tabs to provide for transverse bending of the tabs about the wall of the housing.

22. The condenser microphone of claim 20, wherein the tabs extend radially from the body portion of the spacer.

23. The condenser microphone of claim 20, wherein a portion of a perimeter of the body portion of the spacer does not have a tab depending therefrom.

* * * * *

UNITED STATES PATENT AND TRADEMARK OFFICE
CERTIFICATE OF CORRECTION

PATENT NO. : 7,184,563 B2 Page 1 of 1
APPLICATION NO. : 10/379007
DATED : February 27, 2007
INVENTOR(S) : James S. Collins It is certified that error appears in the above-identified patent and that said Letters Patent is hereby corrected as shown below:

On the Title Page:

Item (73), "LLC." should be -- LLC --.

In the Claims:

At Column 8, line 41, "having cavity" should be -- having a cavity --.

Signed and Sealed this

Eighteenth Day of September, 2007

JON W. DUDAS
*Director of the United States Patent and Trademark Office*